United States Patent [19]

Dates et al.

[11] 4,056,650

[45] Nov. 1, 1977

[54] PROCESS FOR MAKING ALUMINUM-COATED GLASS-CERAMIC COOKING VESSEL AND ARTICLE PRODUCED THEREBY

[75] Inventors: Harold F. Dates, Corning; Joseph J. Domicone, Horseheads; Joseph E. Nitsche, Corning, all of N.Y.

[73] Assignee: Corning Glass Works, Corning, N.Y.

[21] Appl. No.: 712,479

[22] Filed: Aug. 9, 1976

Related U.S. Application Data

[63] Continuation of Ser. No. 524,521, Nov. 18, 1974, abandoned.

[51] Int. Cl.$^2$ .............................................. B32B 15/04
[52] U.S. Cl. .................................. 428/332; 427/226; 427/314; 427/383 A; 427/404; 428/432; 65/60 C
[58] Field of Search ............... 427/226, 343, 314, 380, 427/372 R, 383 A, 404; 428/450, 538, 433, 432, 332; 65/33, 60

[56] References Cited

U.S. PATENT DOCUMENTS

| | | | |
|---|---|---|---|
| 2,053,923 | 9/1936 | Stewart | 427/401 |
| 2,162,980 | 6/1939 | Smith | 427/314 |
| 2,197,274 | 4/1940 | Menke | 427/314 |
| 2,438,877 | 3/1948 | Spruance | 148/6.16 |
| 2,962,389 | 11/1960 | Menke | 428/433 |
| 3,019,515 | 2/1962 | Whitehurst et al. | 427/404 |
| 3,428,513 | 2/1969 | Dennison | 427/314 |
| 3,432,331 | 3/1969 | Braddy et al. | 427/314 |
| 3,479,217 | 11/1969 | Spraoudis | 427/343 |
| 3,523,013 | 8/1970 | Small | 29/197 |
| 3,567,509 | 3/1971 | Kuiper | 428/433 |
| 3,615,318 | 10/1971 | Jagodzinski et al. | 65/33 |
| 3,734,767 | 5/1973 | Church et al. | 427/372 |

FOREIGN PATENT DOCUMENTS

696,256  10/1964  Canada.

*Primary Examiner*—Harry J. Gwinnell
*Assistant Examiner*—Sadie L. Childs
*Attorney, Agent, or Firm*—Kees van der Sterre; Clinton S. Janes, Jr.; Clarence R. Patty, Jr.

[57] ABSTRACT

Aluminum-coated glass-ceramic cookware of improved performance and durability is provided by a process comprising selecting a glass-ceramic vessel of specified strength and expansion characteristics, preheating the surface of the vessel to a temperature in the range of about 120°–600° C., flame-spraying molten powdered aluminum metal onto the surface of the vessel, optionally heat-treating the thus-coated vessel to provide an aluminum metal coating of excellent adherence and good thermal conductivity thereon, providing the aluminum coating with a film of phosphoric acid and heating said aluminum coating and film to a temperature at least sufficient to decompose the phosphoric acid. A supplemental oxide film may also be applied to protect the aluminum metal coating.

2 Claims, No Drawings

PROCESS FOR MAKING ALUMINUM-COATED GLASS-CERAMIC COOKING VESSEL AND ARTICLE PRODUCED THEREBY

This is a continuation, of application Ser. No. 524,521, filed Nov. 18, 1974 now abandoned.

BACKGROUND OF THE INVENTION

The application of metallic coatings to glasses is widely employed to impart desirable physical properties such as thermal and electrical conductivity or reflectivity thereto, and many processes for applying such coatings to glasses are known.

Thick, thermally-conductive coatings on glass cooking vessels are particularly desirable to obtain improvements in thermal conductivity over the relatively poor conductivity exhibited by glasses alone. One method of applying thermally-conductive aluminum coatings to glass articles is described in U.S. Pat. No. 2,053,923, and involves the spray application of molten aluminum to a hot glass surface to obtain an adherent, conductive coating.

More recently, semicrystalline glasses or glass-ceramics have been utilized to produce cookware of improved strength and thermal durability, but again the low thermal conductivity of these materials as compared to metals has made the use of metallic coatings in combination therewith attractive. U.S. Pat. No. 3,523,013 describes one method of providing a glass-ceramic container with a metallic thermally-conductive coating.

The principal problems in the art of metal-coating glass-ceramic vessels arise out of the substantial differences in thermal expansion behavior between the conventional glass-ceramic materials used for the fabrication of cookware and common metals such as aluminum and copper which might be considered for use as coatings in combination with these glass-ceramics. For example, glass-ceramic materials typically employed for cookware fabrication exhibit rather low coefficients of thermal expansion, e.g., on the order of $10\text{-}25 \times 10^{-7}/^\circ$ C, whereas aluminum, which has a desirable thermal conduction capability, has a coefficient of thermal expansion of about $230 \times 10^{-7}/^\circ$ C. Theoretical stresses which may arise as a result of this expansion mismatch over the typical temperature range of use of an aluminum metal-glass-ceramic composite cooking vessel approach 100,000 psi, a stress level well above the failure point of both the glass-ceramic substrate and the aluminum coating. Increases in the thermal expansion of the glass-ceramic material to alleviate this expansion mismatch are not possible without sacrificing the excellent thermal shock resistance of this material, a major desirable feature of glass-ceramic cookware.

Prior art processes of applying aluminum or other conductive metal coatings to glass-ceramic vessels are disadvantageous for several reasons. First, multiple coating steps have been employed in order to achieve the desired degree of bonding together with a thickness providing a useful level of thermal conductivity. Secondly, metal application under controlled neutral-atmosphere conditions has been required. And finally, molten metal application has typically been carried out only by applying the molten metal to very hot glass-ceramic surfaces, in order to achieve the degree of bonding which was thought to be required.

Aluminum-coated cooking vessels prepared in the conventional manner may exhibit a variety of undesirable characteristics in the course of use over an extended period of time. Repeated thermal cycling may eventually produce delamination of the aluminum coating, affecting the appearance and thermal performance of the product. Also, occasional severe thermal downshock which is experienced by a hot vessel transferred from the stovetop to cold water can cause immediate failure of the vessel because of the very high stresses generated during rapid, non-uniform cooling. Whereas these problems are not too severe with thin (1–10 mil) coatings, thicker coatings, on the order of 20 mils, which are required to achieve improved heat distribution, substantially increase the likelihood of thermal shock breakage.

Accordingly, it is a principal object of the present invention to provide an aluminum-coated glass-ceramic cooking vessel suitable for stovetop use which combines the attractiveness and thermal shock resistance of glass-ceramic cookware with the desirable heating characteristics of metal cookware.

It is another object of the present invention to provide an improved process for manufacturing aluminum-coated cookware which overcomes many of the disadvantages of prior art processes for producing such ware.

Other objects and advantages of the invention will become apparent from the following summary and detailed description thereof.

SUMMARY OF THE INVENTION

We have now developed a process for providing an adherent durable thermally-conductive aluminum coating on a glass-ceramic vessel which is less complex than prior art coating processes and which yet provides a firmly-bonded durable aluminum coating. Moreover, through proper selection of glass-ceramic vessels to be treated, aluminum-coated vessels exhibiting very high resistance to thermal shock breakage can be produced. Treatment according to our process produces an aluminum coating of improved durability when subjected to thermal cycling, and the use of a supplemental protective oxide coating on the aluminum substantially improves product resistance to cosmetic deterioration.

Briefly, our process first comprises selecting a glass-ceramic vessel to be treated which is composed of a conventional low-expansion lithium aluminosilicate glass-ceramic material, but which preferably has specified strength and thermal expansion characteristics. We have found that control over strength and thermal expansion, particularly over the relationship between strength and expansion, is important in obtaining an aluminum-coated glass-ceramic vessel which can withstand repeated thermal shock (e.g., five times from 500° C. to water) without breakage.

Following selection of a suitable glass-ceramic vessel for treatment, a selected surface portion such as the bottom of the vessel which is to receive the aluminum coating is preheated to a temperature in the range of about 120°–600° C prior to the application of the molten aluminum thereto. We have found that preheating of the surface to more elevated temperatures, such as in the prior art were deemed necessary in order to promote bonding between the aluminum and the glass-ceramic substrate, are not required to obtain bonding sufficient to prevent separation of the coating at the aluminum-glass-ceramic interface.

Following preheating of a selected surface portion of the glass-ceramic vessel to be coated, finely-divided molten aluminum is produced by combustion-heating of finely-divided powdered aluminum and projected onto the preheated surface portion in the form of a spray. Commercially-available aluminum powders and powder-flame spraying equipment are suitable for use in applying the aluminum coatings. The spray is applied in a quantity sufficient to provide an aluminum coating ranging about 18–28 mils in thickness on the glass-ceramic vessel.

Following the application of the aluminum coating by powder-flame spraying as described, the aluminum-coated vessel may be subjected to a heat-treatment at a temperature in the range of about 400°–600° C for a time in the range of about ¼ to 2 hours to produce a durable thermal-shock-resistant product. This heat treatment is utilized when low temperature (120°–350° C) preheating of the vessel has been employed because it produces a desirable shift in the properties of the aluminum coating and also improves the bond between the glass-ceramic vessel and the aluminum metal coating, as will hereinafter more fully appear. Its use in combination with low temperature preheating of the vessel is deemed essential in obtaining a product exhibiting the desired degree of resistance to deterioration on thermal cycling and thus extended service life.

Finally, further improvements in the thermal cycling behavior and appearance after use of aluminum-coated vessels produced as described can be realized by providing the aluminum coating with a protective film of $SiO_2$, $B_2O_3$, $P_2O_5$, or mixtures thereof. These protective oxide films are produced by providing the aluminum coating with a film of compounds of silicon, boron and/or phosphorus which are thermally decomposable to $SiO_2$, $B_2O_3$ or $P_2O_5$ on heating, and thereafter heating the compound-coated vessel to provide an oxide film of $SiO_2$, $B_2O_3$ and/or $P_2O_5$ on the aluminum. Aluminum coatings provided with $SiO_2$, $B_2O_3$ and/or $P_2O_5$ oxide films in this manner not only resist discoloration but also exhibit improved resistance to deterioration of the aluminum coating caused by thermal cycling.

DETAILED DESCRIPTION

One of the principal problems associated with aluminum-coated glass ceramic vessels known in the prior art is their inability to withstand thermal shock without breakage. If an aluminum coating of useful thickness (at least about 18 mils) is firmly bonded to the bottom of the vessel so that the stresses of thermal cycling are not released by delamination or cracking of the coating, vessel failure from thermal stresses can be induced by thermal downshock to cold (8° C) water from temperatures as low as 400° C. We have found that a significant level of thermal breakage in service can be expected where the thermal shock resistance of the vessel is this low.

In accordance with a preferred embodiment of the present invention, aluminum-coated vessels having a thermal downshock capability of at least 450° C are produced by controlling the strength and thermal expansion characteristics of the glass-ceramic vessel to be coated. For this purpose the selected glass-ceramic vessel will have an abraded modulus of rupture strength (MOR) of at least about 9,000 psi, as determined on abraded sample bars of the selected glass-ceramic material in the conventional manner. Also the average linear coefficient of thermal expansion ($\alpha$) of the selected glass-ceramic material will not exceed about $15 \times 10^{-7}/°$ C over the temperature range 0°–300° C.

The relationship between the strength and thermal expansion characteristics of the vessel material should also be controlled, since vessels having near-minimum strengths must be lower in expansion and vessels having near-maximum expansion must be higher in strength, in order to exhibit the thermal downshock capability required. For this reason, the ratio of strength to thermal expansion (MOR)/($\alpha$) defined as above described should be at least $1.1 - 10^{10}$ (psi ° C) in glass-ceramic vessels selected as substrates for the coating process.

Preferred glass-ceramic vessels selected for coating in accordance with the invention will have average vessel wall thicknesses which are conventional for pressed glass-ceramic ware, e.g., in the range of about 0.150–0.220 inches, so that the minimum vessel wall thickness in selected surface portions to be coated will be at least about 0.150 inches. The above-stated minimum strength-to-thermal expansion ratio has been defined with reference to vessels of conventional wall thickness. It will of course be recognized that lower ratios could be employed where thinner ware is utilized, or where lower thermal durability requirements are set. Ratio requirements may also be affected by the glass-ceramic flaw population in the vessels selected for treatment.

In general, glass-ceramic vessels to be coated with aluminum according to the present invention are of lithium aluminosilicate composition and comprise a principal crystal phase composed predominantly of beta-spodumene solid solution, a solid solution between silica and beta-spodumene. ($Li_2O.Al_2O_3.4SiO_2$) wherein the silica to lithia mole ratio can be as high as 7:1 or more. While the abraded modulus of rupture strengths and coefficients of thermal expansion of beta-spodumene glass-ceramics may vary according to composition and crystallizing heat treatment, typical strengths for these materials are on the order of at least about 9,000 psi, and typical expansions range from about $10-15 \times 10^{-7}/°$ C. over the temperature range 0°–300° C.

To obtain higher strength in vessels of near-maximum thermal expansion which may be selected for coating, it is possible to employ ion exchange strengthening treatments involving the exchange of sodium ions from a molten sodium salt bath for lithium ions in the beta-spodumene crystals of the glass-ceramic material. Such ion-exchange strengthening treatments produce permanent compressive stresses in the surfaces of the glass-ceramic material which substantially increase the modulus of rupture strength thereof. We particularly prefer to employ the sodium ion-exchange treatments described in British Patent No. 1,105,434, involving exposure of the selected glass-ceramic vessel to be coated to a molten sodium-containing salt bath at temperatures in the range of 450°–600° C for times in the range of ¼–4 hours, in order to obtain a modulus of rupture strength of at least about 20,000 psi in the ion-exchanged glass-ceramic vessel. The disclosure of British Patent No. 1,105,434 is expressly incorporated herein by reference for a detailed description of the sodium ion-exchange strengthening of lithium alumino-silicate glass-ceramics containing beta-spodumene solid solution as the principal crystal phase.

However, where the glass-ceramic vessel selected for coating is one having a coefficient of thermal expansion near $15 \times 10^{-7}/°$ C (0°–300° C), and ion-exchange strengthening has been utilized to achieve an (MOR)/($\alpha$) ratio of $1.1 \times 10^{10}$ psi ° C., it is desirable to utilize low-temperature preheating for the application of the aluminum coating in order to avoid loss of strength in the vessel due to potential high temperature stress release.

Following the selection of a suitable glass-ceramic vessel as above described, the vessel is prepared for the application of the aluminum coating by preheating a selected surface portion thereof which is to receive the coating. It is desirable prior to this step to thoroughly clean the surface of the vessel in the manner conventional for metal coating processes with a detergent and distilled water to remove foreign materials which might interfere with aluminum-glass-ceramic bonding.

The preheating which is employed prior to the application of the aluminum according to our process is somewhat less severe than that typically employed in the prior art to bond aluminum to glass-ceramics, and even in some cases to bond aluminum to glasses. Thus whereas preheating to temperatures in the 1200°–1600° F range was deemed desirable in the prior art in order to provide a soft, reactive glass-ceramic surface for aluminum deposition, we limit our preheating to achieve glass-ceramic surface temperatures in the range of 120°–600° C., which temperatures are readily obtainable using a conventional lehr or even the open flame produced by the aluminum flame-spraying equipment.

We have discovered that extensive preheating of the glass-ceramic surface is not required in order to obtain sufficient aluminum-glass-ceramic bonding. Thus aluminum metal-glass-ceramic separations are not observed using our process; rather spalling of the aluminum coating induced by severe thermal shock or very prolonged thermal cycling of our vessels apparently involves the failure and separation of a surface portion of the glass-ceramic vessel rather than a separation of the metal from the glass-ceramic.

Moreover, there is some evidence that conventional high-temperature preheating produces extensive reaction between the glass-ceramic substrate and the molten aluminum metal during the deposition process, and this reaction may deleteriously affect the properties of the aluminum coating. More specifically, the reduction of silica and the migration of silicon metal into the aluminum coating can occur to a substantial degree where extensive aluminum-glass-ceramic interaction occurs during deposition. Such migration produces an aluminum-silicon alloy at the bonding interface which is substantially less ductile than alumimum.

Whereas some glass-ceramic substrate-aluminum metal interaction is obviously required to obtain a useful degree of coating-substrate bonding, we have concluded that the extensive reaction which may occur at high temperatures between a softened glass-ceramic substrate and molten aluminum is neither necessary nor desirable in the production of an adherent aluminum coating. And of course the economic advantages of shorter, lower temperature preheating treatments are substantial.

Following the cleaning and preheating of a selected surface portion of the glass-ceramic vessel to be coated, molten aluminum metal is applied to the preheated surface portion in the form of a spray. We have found that the method of producing the spray can substantially affect the service life of the coating, and for this reason prefer to employ a flame-spraying process wherein an aluminum powder feed is melted and projected onto the glass-ceramic surface by means of a combustion flame.

The selection of powder-flame spraying as the method of aluminum coating deposition is based largely on the results of extensive thermal cycling tests wherein aluminum-coated cooking vessels are repeatedly cycled from a hot (600° C) electric burner element to cold (15° C) water, simulating the effects of prolonged use on the appearance and thermal properties of the aluminum coating. While these conditions of testing are substantially more severe than would normally be encountered in home use, the results are useful as a basis for comparing the durability of coatings.

Typical cycling according to this test procedure involves 20 minutes of contact between the vessel and the hot burner element, followed by quenching and a 20 minute immersion in the cold water. This cycle is continuously repeated. The aluminum-coated vessels are visually examined and tested periodically during the course of thermal cycling to evaluate the durability of the coating. The level of coating deterioration is evaluated by rating the coating on a scale of 0–9, with 0 corresponding to no apparent aluminum coating damage, 1–4 corresponding to increasing levels of microscopically detectable cracking damage to the coating, and 5–9 corresponding to increasing levels of visual cracking damage to the coating. A rating of 9 corresponds to substantial cracking of the coating and/or localized coating loss attributed to spalling of the vessel material, although the thermal performance of the vessel may still be acceptable.

When tested according to this thermal cycling procedure, aluminum-coated vessels provided with coatings utilizing aluminum powder feed and combustion flame melting and spraying appear to exhibit a higher average level of durability than aluminum-coated vessels coated by other methods. Thus, aluminum-coated skillets prepared using a wire flame spray process (aluminum wire feed with combustion flame melting and spraying) reached a rating of 9 after treatment through about 132–167 thermal cycles according to the above described procedure, whereas aluminum-coated skillets prepared according to our process, utilizing an aluminum powder feed/flame-spraying process, normally average at least about 300 thermal cycles and typically more before a rating of 9 is reached.

We have found that most the commercially-available aluminum metal powders may be employed as the source of aluminum for the coating according to our process with useful results. These powders typically consist largely of aluminum metal particles having sizes in the range from about 80–325 mesh (U.S. Standard Sieve).

Conventional metal powder flame spraying equipment may be utilized for applying these powders to the glass-ceramic vessel. The powder flame spraying process typically comprises melting the aluminum powder in a combustion flame which may be either a hydrogen-oxygen or acetylene-oxygen flame, the aluminum powder being introduced into the vicinity of the flame by entrainment in a nitrogen carrier gas, and then projecting the molten aluminum spray onto the preheated selected surface portion of the glass-ceramic material to be treated. A more complete description of this conventional process may be found in the Metco Metallizing Handbook, 3rd Edition, Volume II, H. S. Ingam and A. P. Shepard, Metallizing Engineering Co., Inc. Westbury, L.I., N.Y. (1959), and reference may be made thereto for a further explanation of these procedures.

We have found that an aluminum coating having an average thickness in the range of about 18-28 mils provides an aluminum-coated cooking vessel exhibiting excellent thermal durability and heat distribution characteristics equivalent or superior to cast iron cookware, even after prolonged use. The production of an aluminum coating in this thickness range normally requires that the surface portion of the glass-ceramic vessel to be coated be scanned several times with the powder flame spraying device, obtaining the desired thickness by the step-wise addition of aluminum layers.

Following the deposition of an aluminum coating of sufficient thickness on the selected surface portion of the glass-ceramic vessel to be treated, aluminum-coated vessels which have been coated after low temperature (120°-350° C) preheating are subjected to a post-deposition heat treatment to obtain the desired properties of strength and thermal durability in the finished product. Typical heat treatments comprise exposure to a temperature in the range of about 400°-600° C for times in the range of about ¼-2 hours.

This heat treatment is employed not only to enhance the strength and ductility of the aluminum coating over these properties of the as-applied aluminum, but also to improve the bond strength between the coating and the substrate glass-ceramic material where low temperature preheating prior to aluminum deposition has been employed. We have found that it is important in carrying out this treatment to observe the above temperature limitations, since both insufficient heating and excessive heating appear to reduce product life over a prolonged period of thermal cycling.

The processes of bond development and ductility enhancement are both time and temperature dependent, so that at higher temperatures within the range set forth, shorter exposures should be utilized, and vice versa. Preferred thermal treatments to optimize coating properties comprise exposure to temperatures in the range of 450°-550° C for ½-2 hours. These treatments avoid the risk of excessive heating which can cause extensive coating-substrate reaction. On the other hand, insufficient heating results in substantially increased aluminum-substrate interface separation after only short-term exposure to thermal cycling.

The use of low-temperature preheating in combination with post-deposition heat treatments not exceeding about 500° C is particularly desirable in the aluminum coating of glass-ceramic vessels which have been strengthened by ion-exchange techniques. However, where low-expansion vessels not requiring strengthening are selected, high temperature (500°-600° C) preheating may be utilized, and in that event post deposition heat treatments are not required.

Aluminum-coated vessels prepared according to the above-described processes typically exhibit a thermal downshock capability substantially in excess of the capability of vessels prepared according to other methods. In one test, twelve aluminum-coated cooking vessels were subjected to five thermal downshock cycles each from a 500° C oven to 8° C water to induce breakage. All vessels had bottom thicknesses of about 0.190 inches, were composed of a beta-spodumene glass-ceramic material having a thermal expansion ($\alpha$) of about $12 \times 10^{-7}$/° C (0°-300° C), and were coated on the vessel bottom portions to an aluminum thickness of about 24 mils by preheating to about 200° C, flame-spraying with aluminum powder, and heat-treating the coated vessel at 500° C for 1 hour. However six of the vessels were ion-exchange strengthened prior to coating to improve the inherent abraded modulus of rupture strength thereof above the initial value of about 11,000 psi. Only one of the six strengthened vessels suffered thermal breakage in this test, whereas four of the unstrengthened vessels broke due to thermal shock.

Notwithstanding the high thermal shock resistance of vessels produced as above described, we have discovered that the thermal cycling behavior of these vessels may be further improved and the resistance of the aluminum coating to discoloration may be enhanced by providing the aluminum coating with a supplemental protective oxide film, consisting essentially of at least one oxide selected from the group consisting of $SiO_2$, $B_2O_3$ and $P_2O_5$.

In accordance with this embodiment of our invention, the aluminum coating on the glass-ceramic vessel is provided with the described oxide film by, first, depositing on the aluminum coating a film of at least one thermally-decomposable compound which upon thermal decomposition produces at least one oxide selected from the above group, and thereafter heating the aluminum-coated vessel and film of thermally-decomposable compounds to obtain a film of the desired oxides.

Preferably the surface of the aluminum coating is finished prior to deposition of the oxide film, since finishing improves the appearance, cleanability and contact heating properties of the coating and also provides a better substrate for the deposition of the film. Conventional treatments for this purpose which include wire brushing and/or grinding and polishing with abrasives, may be utilized for surface finishing.

The film of thermally-decomposable compounds may be provided on the aluminum coating by any means which will insure complete and uniform dispersion thereof. Preferably, however, it is provided by dissolving soluble thermally-decomposable compounds in a suitable solvent such as water or methyl alcohol, and applying the solution to the aluminum coating by brushing, dipping, or spraying. Preferred thermally-decomposable compounds for this purpose are boric acid and phosphoric acid. Alternatively, the film of thermally-decomposable compound may be provided without the use of a solvent by direct application, as for example, where the compound selected is a liquid. Tetraethyl orthosilicate is an example of a compound suitably applied by this method.

Following the application of a film of the selected decomposable compound or compounds, the vessel with film is heated to a temperature at least sufficient to decompose the compounds to oxides and bond the oxides to the surface of the aluminum coating. Temperatures of at least about 450° C are sufficient for this purpose, with temperatures in the range of about 450°-550° C being preferred. Generally, heating for a time of up to about ½ hour is sufficient to obtain decomposition and bonding; longer heating is not preferred because of possible deleterious effects on the aluminum coating and the aluminum-glass-ceramic bond.

The effectiveness of protective oxide films such as above described in retarding discoloration and cracking damage caused by repeated thermal cycling as above described is ascertained by subjecting both protected and unprotected aluminum-coated glass-ceramic skillets to the thermal cycling treatment hereinabove described. In general, whereas the incidence of a 9 quality rating can become significant for unprotected skillets after as few as 300 thermal cycles, the incidence of a 9 rating for aluminum-coated skillets having protective oxide films normally does not become significant until the 450–500 thermal cycle range has been reached. The discoloration of the aluminum coating induced by repeated thermal cycling is also substantially reduced.

The process of the present invention may be further understood by reference to the following detailed examples thereof.

EXAMPLE I

A circular glass-ceramic skillet approximately 1⅞ inches in depth, 10 inches in diameter, and having an average bottom thickness of about 0.190 inches, is selected for treatment. This skillet is composed of a lithium alumino-silicate glass ceramic material having an oxide composition, in weight percent, of about 70% $SiO_2$, 18% $Al_2O_3$, 3% $Li_2O$, 5% $TiO_2$, 3% MgO and 1% ZnO, and having a principal crystal phase composed predominantly of beta-spodumene solid solution. The glass-ceramic material has an abraded modulus of rupture strength of about 11,000 psi and a coefficient of thermal expansion of about $12 \times 10^{-7}/°C$ (0°–300° C).

The selected skillet was ion-exchange strengthened by immersion in a bath of a molten $Na^+$ salt at 460° C for 2½ hours, removed and washed to remove excess salt. The abraded modulus of rupture strength of the glass-ceramic material making up the vessel is increased to about 25,000 psi by this treatment.

The bottom portion of the ion-exchange strengthened skilled which is to receive the aluminum coating is thoroughly cleaned with a commercially-available detergent and rinsed with distilled water to remove all traces of grease, oil, dirt or other foreign matter which could affect bonding.

The clean, strengthened skillet is then masked with a steel mask to cover the side portions thereof and provided with an aluminum coating through the use of a commercially-available Metco Type 2P Thermo Spray Gun. The bottom surface of the skillet is preheated to about 200° C by twice scanning the surface with the spray gun flame, which is a hydrogen-oxygen flame produced by combustion of hydrogen and oxygen at flow rates of 137 cubic feet per hour of hydrogen and 28 cubic feet per hour of oxygen. The spray gun standoff is 6½ inches.

After preheating and without interruption of the automatic spray gun traverse mechanism, powdered metallic aluminum is fed into the gun, through the combustion flame, and onto the skillet at a rate of about 40 grams per minute, and six additional scans of the skillet are completed during which a molten spray of aluminum is deposited on the glass-ceramic surface. The aluminum powder used is Reynolds LSA 896, a powder which is commercially available from the Reynolds Aluminum Company of Richmond, Virginia. The aluminum metal powder has a size distribution of 1.6% on 170 mesh, 62.1% on 230 mesh, 31.5% on 325 mesh, and 4.8% through 325 mesh (U.S. Standard Sieve). An aluminum metal coating about 25 mils in thickness is provided on the skilled bottom by the flame-spray application of this powder in the manner described.

Immediately after deposition of the aluminum coating on the bottom of the strengthened skillet, the aluminum-coated skillet is enclosed in a box-type lift-top furnace, heated to a temperature of 500° C, maintained at that temperature for ½ hour, and finally cooled to room temperature. It is then removed from the furnace and the aluminum coating is given a brief abrasion finishing treatment with 180 grit silicon carbide paper to remove surface irregularities.

The aluminum-coated skillet prepared as described has excellent thermal shock resistance, withstanding thermal downshock from about 640° C to cold (8° C) water without breakage. It also exhibits substantially improved temperature distribution characteristics, showing a maximum heated temperature differential across the aluminum-coated bottom portion of less than about 80° C, as compared with 90°–100° C for cast iron ware and 150°–160° C for a non-aluminized glass-ceramic skillet under equivalent heating conditions.

EXAMPLE II

An aluminum-coated skillet prepared and finished as described in Example I is provided with a protective oxide film to enhance the thermal cycling durability of the aluminum coating. An aqueous solution consisting of 10% boric acid, 10% phosphoric acid and the remainder water by weight is prepared and heated to a temperature of 160° F. The hot solution is then applied to the aluminum-coated bottom surface of the glass-ceramic skillet by brushing, and the solution-coated skillet is then dried at 120° C to remove water. Finally the skillet is heated to 475° C, maintained at that temperature for ½ hour, and cooled to room temperature. The boric acid and phosphoric acid are converted by this heat treatment to $B_2O_3$ and $P_2O_5$, and these oxides are bonded to the aluminum coating to provide an adherent, protective $B_2O_3$-$P_2O_5$ surface film.

This skillet exhibits excellent thermal shock resistance and temperature distribution capability. Moreover, it exhibits excellent thermal durability, as evidenced by the high degree of resistance to discoloration and cracking shown by the oxide-protected aluminum coating, even after prolonged thermal cycling from a hot electric burner element to water as hereinabove described.

EXAMPLE III

A circular glass-ceramic skillet having a configuration and composition such as described in Example I is selected for treatment. The beta-spodumene glass-ceramic making up the skillet has an expansion ($\alpha$) of about $11 \times 10^{-7}/°C$ (0°–300° C) and an abraded modulus of rupture strength of about 12,500 psi.

The bottom portion of this skillet is thoroughly cleaned with a commercially available detergent and rinsed with distilled water to remove all traces of grease, oil, dirt or other foreign matter which could affect bonding.

The clean skillet is then provided with a steel mask to cover the side portions thereof and the skillet and mask are placed in a box-type lift-top furnace and preheated to a temperature of 500° C.

The furnace is then opened, the skillet removed, and an aluminum coating about 25 mils in thickness is applied to the bottom of the skillet according to the powder flame-spraying procedure described in Example I. The aluminum-coated skillet is then cooled to room temperature. Finally, the aluminum-coating is finished by polishing with 180 grit abrasive paper.

The aluminum-coated skillet prepared as described is subjected to repeated thermal cycling, each cycle comprising exposure to a hot (600° C) electric burner element for 20 minutes followed by exposure to cold (15° C) water for 20 minutes. The skillet reaches a rating of 9 as hereinabove described after 389 thermal cycles.

EXAMPLE IV

An aluminum-coated skillet prepared and finished as described above in Example III is provided with a protective oxide film to enhance the thermal cycling durability of the aluminum coating. An aqueous solution consisting of 10% boric acid and the remainder water by weight is prepared and heated to a temperature of 160° F. The hot solution is then applied to the finished aluminum-coated bottom surface of the glass-ceramic skillet by brushing, and the solution-coated skillet is then dried at 120° C to remove water. Finally the skillet is heated to 550° C for ½ hour and cooled to room temperature, leaving a protective, adherent $B_2O_3$ film on the aluminum coating.

The skillet thus prepared is subjected to repeated thermal cycling as described in Example III, and reaches a rating of 9 at 606 cycles.

From the above examples it is apparent that our process provides vessels which very effectively combine the desirable heating properties of metallic vessels with the superior cleanability and attractiveness of glass-ceramic cookware.

We claim:

1. A process for producing an aluminum-coated glass-ceramic cooking vessel exhibiting improved thermal durability which comprises the steps of:
   a. selecting a glass-ceramic vessel composed of a lithium aluminosilicate glass-ceramic material comprising a principal crystal phase consisting of beta-spodumene solid solution;
   b. preheating at least a selected surface portion of the glass-ceramic vessel to a temperature in the range of about 120°–600° C;
   c. applying to the preheated selected surface portion a molten aluminum metal spray, said spray being produced by melting an aluminum metal powder and being applied in a quantity sufficient to provide an aluminum metal coating on the vessel having a thickness in the range of about 18–28 mils;
   d. providing the aluminum coating with a film of phosphoric acid; and
   e. heating said aluminum coating and film to a temperature at least sufficient to decompose the phosphoric acid.

2. An aluminum-coated glass-ceramic cooking vessel provided according to the process of claim 1.